United States Patent
Voonna et al.

(10) Patent No.: US 10,091,837 B2
(45) Date of Patent: Oct. 2, 2018

(54) PERSONAL INFORMATION MANAGEMENT CONTEXT LINKS

(71) Applicant: Samsung Electronics Co., Ltd., Suwon-si, Gyeonggi-do (KR)

(72) Inventors: Thirumalarao Voonna, Richardson, TX (US); Niranjan, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 695 days.

(21) Appl. No.: 14/070,826

(22) Filed: Nov. 4, 2013

(65) Prior Publication Data

US 2014/0059439 A1   Feb. 27, 2014

Related U.S. Application Data

(63) Continuation of application No. 12/776,915, filed on May 10, 2010.

(51) Int. Cl.
*G06F 3/0482* (2013.01)
*H04W 92/08* (2009.01)
*H04M 1/2745* (2006.01)

(52) U.S. Cl.
CPC ..... *H04W 92/08* (2013.01); *H04M 1/274508* (2013.01); *H04M 1/274516* (2013.01); *H04M 1/274583* (2013.01)

(58) Field of Classification Search
CPC . H04W 92/08; H04M 1/274508; G06F 3/048; G06F 17/30265; G06F 17/30958; G06F 17/30997; G06Q 10/10

USPC .......................................................... 715/853
See application file for complete search history.

(56) References Cited

U.S. PATENT DOCUMENTS

| | | | |
|---|---|---|---|
| 2003/0158837 A1 | 8/2003 | Suzuki et al. | |
| 2004/0128322 A1* | 7/2004 | Nagy | G06Q 10/10 |
| 2005/0060276 A1 | 3/2005 | Nielsen et al. | |
| 2007/0240081 A1* | 10/2007 | Grossman | G06Q 10/10 715/854 |
| 2007/0294349 A1 | 12/2007 | Chickering et al. | |
| 2008/0001717 A1 | 1/2008 | Fiatal | |
| 2008/0172628 A1* | 7/2008 | Mehrotra | G06F 17/30997 715/771 |
| 2009/0115872 A1* | 5/2009 | Lazaridis | H04M 1/72522 348/231.99 |
| 2009/0213088 A1 | 8/2009 | Hardy et al. | |
| 2009/0215486 A1 | 8/2009 | Batni et al. | |
| 2009/0285477 A1* | 11/2009 | Wu | H04M 1/2745 382/165 |
| 2009/0324137 A1* | 12/2009 | Stallings | G06F 17/30265 382/306 |
| 2010/0049874 A1* | 2/2010 | Chene | G06F 17/30569 709/246 |

(Continued)

*Primary Examiner* — Justin S Lee
(74) *Attorney, Agent, or Firm* — Jefferson IP Law, LLP

(57) ABSTRACT

An apparatus and method for managing information in a mobile terminal are provided. The method includes selecting a first object to be linked, selecting a second object for linking with the first object, and linking the first object with the second object. By linking two objects, a user is better able to determine the context in which one or both object are known, thus improving usability of the information. Moreover, a descriptive tag may be used to link the two objects, thus providing additional information by which to associate one object with another object.

4 Claims, 7 Drawing Sheets

(56) References Cited

U.S. PATENT DOCUMENTS

2010/0082693 A1    4/2010  Hugg et al.
2011/0208572 A1*   8/2011  Ladd ..................... G06Q 30/02
                                                    705/14.16
2012/0278710 A1*  11/2012  Berger ................. G06F 17/248
                                                    715/274

* cited by examiner

PERSONAL INFORMATION MANAGEMENT CONTEXT LINKS

This application is a continuation application of U.S. patent application Ser. No. 12/776,915 filed May 10, 2010 in the U.S. Patent and Trademark Office, the disclosure of which is incorporated herein in its entirety by reference.

BACKGROUND OF THE INVENTION

1. Field of the Invention

The present invention relates to an apparatus and method for managing information in a mobile terminal. More particularly, the present invention relates to an apparatus and method for managing Personal Information Management (PIM) context links in a mobile terminal.

2. Description of the Related Art

Mobile terminals were developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), email, games, remote control of short range communication, an image capturing function using a mounted digital camera module, a multimedia function for providing audio and video content, a scheduling function, and many more. With the plurality of features now provided, a mobile terminal has effectively become a necessity of daily life.

One function provided by a mobile terminal is a contact management function. With the contact management function, a user is able to store and retrieve information about individuals, businesses, organizations, and the like, using the mobile terminal. An advantage of the contact management function is that several pieces of information about a contact can be associated with the contact and easily found by searching on the contact's name. For example, several phone numbers associated with the contact, such as a work number, a home number, a mobile terminal number, a facsimile number, and the like, can all be stored as entries under the contact's name. The contact management function can also provide additional information about the contact such as the contact's email address, a photograph of the contact, and other information of the contact that may be associated with another function. With the contact management function, a user can easily search on a contact's name and find a desired phone number or other information. However, under certain circumstances, the contact management function may not provide the user with the intended convenience of being able to quickly locate information about a contact.

In one case, the user may desire to contact a person whose information was stored using the contact management function but the user may not remember the person's name. For example, if the user meets a new colleague at an industry event, the user may store the new colleague's contact information using the contact management function in the user's mobile terminal. At some later date, the user may come upon a need to contact the new colleague. However, due to passage of time, the user may not remember the new colleague's name. In that case, the user would be forced to review all contacts in order to find the new colleague's information. That is, there is no function provided by the mobile terminal that allows the user to find the colleague's contact information unless the user knows the colleague's name. In that case, the user is greatly inconvenienced, especially if the user has many contacts stored in the mobile terminal.

In another case, a user may browse through contacts displayed on their mobile terminal and discover that there are contacts that the user does not recognize. For example, the user may meet a person at a business meeting or other gathering and decide to exchange contact information that the user stores in his mobile terminal. If sufficient time passes during which the user does not call or otherwise contact the person, the user may not remember the person based solely on the contact information in the mobile terminal. Because the user does not remember the contact based solely on the contact information, the user may delete the contact and thus irretrievably lose the contact information.

In yet another case, a user may store a contact's name and information such as the contact's phone number and email address in his mobile terminal without realizing that a similar name is already stored. Moreover, since mobile terminals typically allow for storing identical names as long as the identical names are each associated with different contact information such as different phone numbers, a user may have two identical names stored in his mobile terminal. In either case, it may be impossible for the user to determine which contact is a desired contact so that the use of the contact management function frustrates the user.

In the above cases, the user of the mobile terminal is inconvenienced by the inability to find a desired contact without knowing the desired contact's name and by the potential to lose important contact information if the user does not recognize the contact. Accordingly, there is a need for an apparatus and method for providing Personal Information Management (PIM) context links in a mobile terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and method for associating information in a mobile terminal with a context related to the information.

Another aspect of the present invention is to provide an apparatus and method for associating an object of the mobile terminal with context related to the object to allow for easier recognition of the object.

Yet another aspect of the present invention is to provide an apparatus and method for associating context with an object of a mobile terminal wherein the associated context can be used to easily find the desired object.

In accordance with an aspect of the present invention, a method for managing information in a mobile terminal is provided. The method includes selecting a first object to be linked, selecting a second object for linking with the first object, and linking the first object with the second object.

In accordance with another aspect of the present invention, an apparatus for managing information in a mobile terminal is provided. The apparatus includes an input unit for selecting a first object to be linked and for selecting a second object for linking with the first object, and a controller for linking the first object with the second object.

In accordance with an aspect of the present invention, a method for finding a first object in a mobile terminal is provided. The method includes associating the first object with a second object in the mobile terminal, and finding the second object.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
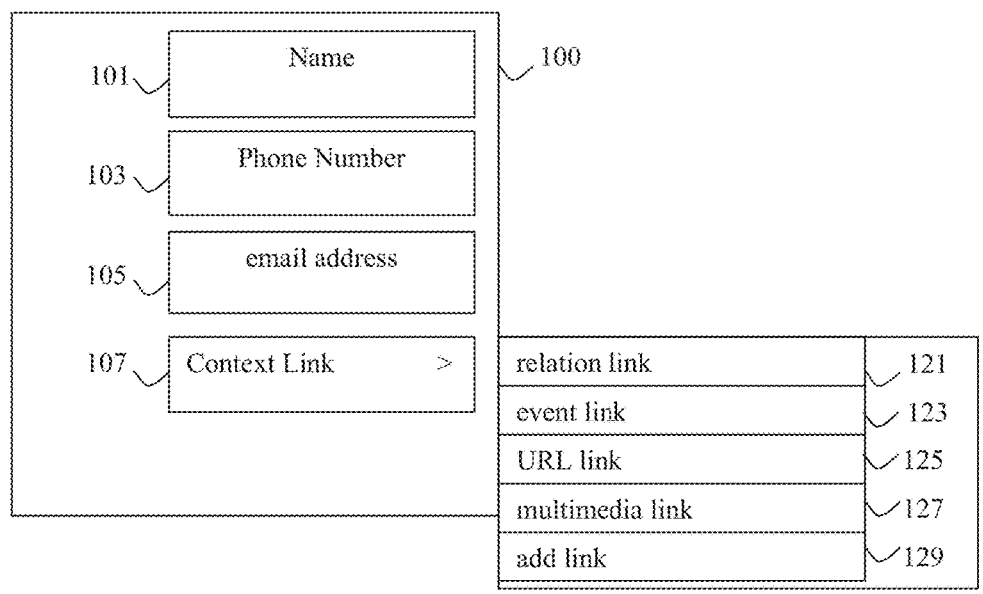
FIG. 1 graphically illustrates an object of a mobile terminal including a Personal Information Management (PIM) context link according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following exemplary embodiments of the present invention are described with reference to a "mobile terminal". However, it is to be understood that this is merely a generic term and that the invention is equally applicable to any of a mobile phone, a palm sized Personal Computer (PC), a Personal Digital Assistant (PDA), a Hand-held PC (HPC), a smart phone, an International Mobile Telecommunication 2000 (IMT-2000) terminal, a wireless Local Area Network (LAN) terminal, and the like. Accordingly, use of the term "mobile terminal" should not be used to limit application of the present inventive concepts to any certain type of apparatus or device.

Exemplary embodiments of the present invention include an apparatus and method for providing Personal Information Management (PIM) context links in a mobile terminal. An exemplary PIM context link allows a user of the mobile terminal to associate an object of the mobile terminal with a context related to the object. By contextually associating the object, the user can more easily recognize the object and can more easily find an object even if specific information about the object is not known. Accordingly, the provision of PIM context links addresses the above described problems of, for example, being able to find a desired contact even if the name of the contact is not known. Exemplary embodiments of the present invention include a PIM context link that may be used to link any object of a mobile terminal.

In the following disclosure, the term "object" may denote a contact associated with a contact management function of the mobile terminal such as a phonebook function, an email or message associated with an email or messaging function of the mobile terminal, an event associated with a scheduling function of the mobile terminal, an image file or a multimedia file stored on the mobile terminal, geographical information (i.e., a geo-tag) provided by an external source, and the like. For example, an object may include a Joint Photographic Experts Group (JPEG) file associated with an image viewer, a Moving Pictures Experts Group (MPEG) or MPEG-1 Audio Layer 3 (MP3) file associated with a multimedia player, and the like. As will be explained in more detail below and according to exemplary embodiments of the present invention, by establishing a context link for an object, a user is able to more easily determine the context in which the object is known.

FIG. 1 graphically illustrates an object of a mobile terminal including a PIM context link according to an exemplary embodiment of the present invention.

Referring to FIG. 1, object 100 in this instance includes a contact associated with a contact management function of the mobile terminal. However, as described above, it is to be understood that the object 100 may include any of a variety of objects associated with the mobile terminal. The object or contact 100 may include a plurality of identifiers associated with the contact such as name 101, phone number 103, and email address 105. Furthermore, according to an exemplary embodiment of the present invention, the contact 100 includes a PIM context link 107. As will be explained in more detail below, the context link 107 allows the user to not only find the contact even if the contact's name 101 is not known, but also provides additional information about the contact to enhance the user's convenience in remembering the contact.

Name 101 is provided to distinguish the contact 100 from other contacts stored in the mobile terminal. Name 101 typically reflects a contact's given name but may include another descriptor such as a nickname or call-sign. While name 101 is meant to distinguish the contact 100 from other contacts included in the mobile terminal, name 101 may be substantially the same or even duplicative of the name of another contact also stored in the mobile terminal. As described above, a mobile terminal typically allows identical names to be stored as long as other data, such as phone number 103, is not also identical. In an instance in which substantially the same or even duplicative names are stored in a mobile terminal, provision of the context link 107 may allow the user to recognize and distinguish between contacts.

Phone number 103 and email address 105, associated with the contact 100, are provided so that the user of the mobile terminal can quickly communicate with the contact 100. That is, by opening the contact 100 and displaying phone number 103 and email address 105, the user is able to communicate with the contact 100 by either placing a telephone call to the contact 100 or emailing the contact 100. Each of phone number 103 and email address 105 are discussed above with regard to a singular occurrence. However, it is to be understood that either or both of these may include a plurality of different information. For example, phone number 103 may include a home phone number, a cellular phone number, a work number, and the like. Similarly, email address 105 may include a plurality of email addresses such as a work address, a home address, and the like.

The context link 107 is provided to establish a relationship or context between the object 100 and one or more other objects in the mobile terminal and/or one or more objects external to the mobile terminal. For example, the context link 107 may provide a link between the contact 100 and another contact, between the contact 100 and an event associated with a calendar function, between the contact 100 and an image or other file associated with a multimedia player, between the contact 100 and a URL, between the contact 100 and a geographical tag, and the like. Additionally, and as will be illustrated in more detail below, a context link may provide a link between any two objects, such as between two image files, between an image file and an event associated with a calendar function, between an image file and a URL, and the like. In other words, although the context link 107 is shown associated with the contact 100, a context link may be provided to link any object of the mobile terminal. Moreover, a context link may provide links between one object and a plurality of other objects, and from one plurality of objects to another plurality of objects. A more detailed explanation of an exemplary context link is provided below.

In the exemplary embodiment of FIG. 1, the context link 107 includes a relation link 121, an event link 123, a URL link 125, and a multimedia link 127. The relation link 121 may be used to describe a relation between the contact 100 and another object to which the contact 100 is linked. For example, the relation link 121 may be used to provide context that the contact 100 is a "friend of," "brother of," "cousin of," and the like, of another object, such as another contact, an image file, and the like. The event link 123 may be used to provide context between the contact 100 as a first object and an event associated with a scheduling function as a second object. For example, the event link 123 may provide context to associate the contact 100 with an event such as a football game or picnic at which the user of the mobile terminal met the contact 100. In that case, the context link 107, and more specifically the event link 123, provides the user a context for associating with the contact 100 and allows the user to more easily remember when or where the contact was met. That is, and as will be described in more detail below, use of the context link 107 allows a user of the mobile terminal to find the contact 100 even though the user may not remember the name of the contact 100.

The URL link 125 may be used to associate an object with an Internet based website. In this case, the URL link 125 may provide a context between the contact 100 and a website associated with the contact's place of employment, the contact's personal website, a social networking website on which the contact has an account, and the like. The multimedia link 127 may be used to associate an object with a multimedia object such as an MPEG file, a JPEG file, an MP3 file, and the like. Similar to the above context links, use of the multimedia link 127 to associate an object and a multimedia file, in this case to associate the contact 100 and a multimedia file, provides the user a context in which the contact 100 is known. For example, if the multimedia link 127 associates the contact 100 with an MP3 file as a favorite song, the user is provided context in which the contact 100 is known and is able to more easily recognize and remember the contact 100.

Although four specific context links are illustrated, it is to be understood that this is merely for convenience of explanation and not intended to be limiting. That is, there may be only a single context link or any number of context links. Also, the number of types of context links is not limited, nor is the number of each type of link. That is, the type of context link may include another type rather than relation, event, URL, and multimedia. Also, there may be a plurality of relation links, a plurality of event links, and the like, such that the user may associate an object with a plurality of contacts using relation links, with a plurality of events using event links, and the like.

The add link 129 represents a menu function to allow the user of the mobile terminal to associate the object, in this case the contact 100, with context associated with the object. For example, the add link 129 may be used to associate the contact 100 with another object of the mobile terminal such as another contact, an event, and the like. As will be explained in more detail below, upon execution of the add link 129, the user may be provided with a series of menu screens for associating the object of the mobile terminal with context associated with the object, or may associate the object with another object, and the like.

FIGS. 2A, 2B, 2C, and 2D illustrate context links according to exemplary embodiments of the present invention.

Figure 2A:
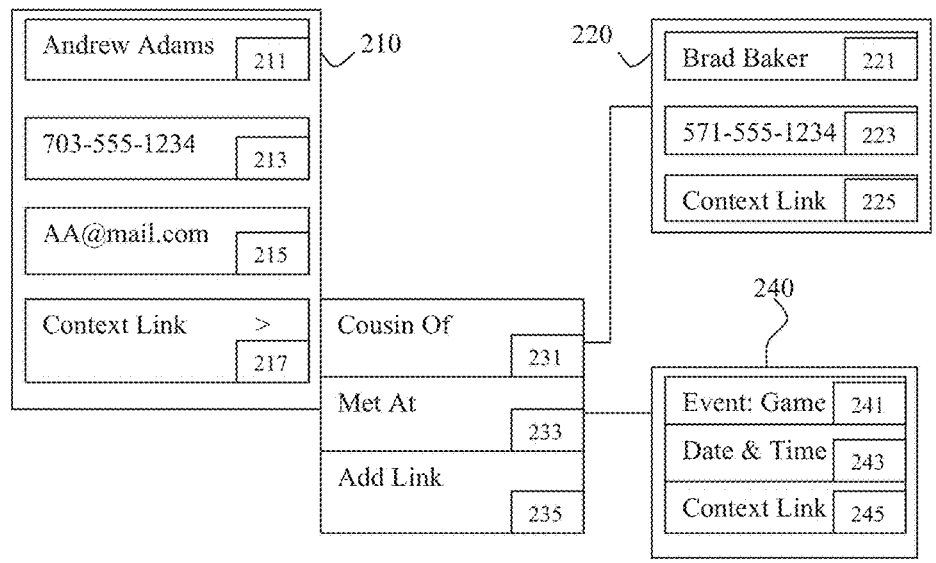
FIGS. 2A, 2B, 2C, and 2D illustrate context links according to exemplary embodiments of the present invention.

Referring to FIG. 2A, a first contact 210 includes various information such as a name 211, a phone number 213, and an email address 215. Of course, it is to be understood that the types and amounts of information associated with the first contact 210 are only shown as an example and not intended to be limiting. As such, the first contact 210 may include additional information such as two or more phone numbers and email addresses, and the like. Furthermore, the first contact 210 includes a context link 217 which provides contextual association of the first contact 210 with other objects. In the illustrated example of FIG. 2A, the context link 217 includes a first link 231 indicating a relation link of the first contact 210 and a second link 233 indicating an event link of the first contact 210. An example of a situation in which the context links 231 and 233 may be established and used will assist in clarifying the invention.

In the example of FIG. 2A, the user of the mobile terminal is friends with or otherwise acquainted with a second contact 220 whose name is Brad Baker. At a sporting event, such as a football or other game, the user is introduced to Andrew Adams who is Brad Baker's cousin. As a result of their meeting, the user decides to add Andrew Adams as a contact in his mobile terminal. When entering Andrew Adams' contact information as the first contact 210, the user may also enter the relation link 231 that indicates Andrew Adams' relation with Brad Baker. In this case, the relation link 231 indicates that Andrew Adams is a cousin of Brad Baker. As a result, when the user finds Andrew Adams among his list of contacts at some time in the future, the user will be aware that Andrew Adams is a cousin of Brad Baker and therefore be provided a context in which the user knows Andrew Adams.

Furthermore, the user may want to include additional information as to the context in which he met Andrew Adams. For example, the user may include in the context link 217 an event link 233 that associates Andrew Adams with an event or occasion, such as the sporting event at which they met. In this example, the event link 233 links Andrew Adams' contact information 210 with an event 240. The event 240 includes a description of the event 241, the date and time of the event 243, and the like.

In an exemplary implementation, the event link 233 may be added manually by the user of the mobile terminal. That is, when the user of the mobile terminal inputs Andrew Adams' contact information 210, the user creates the event link 233 by first selecting the add link function 235 and then manually selecting information regarding the event associated with the meeting of Andrew Adams. In another exemplary implementation, the event link 233 may be automatically generated when the user inputs the contact information 210 of Andrew Adams during a time that coincides with a scheduled event. For example, the user may input information associated with the event 240, such as a start time, a location and a planned duration or end time of the event, into the mobile terminal using a scheduling function. In that case, the event 240 and its associated information may be input several days or weeks before the event 240 is scheduled to occur. When the scheduled event occurs, that is, on the day of the scheduled event and for a time between the scheduled start time and end time of the event or between the scheduled start time and the for scheduled duration of the event, any contact information, such as Andrew Adams' contact information 210, that is input will be automatically associated with the event 240. In that case, the event link 233 will be automatically generated without additional input by the user.

At some time in the future after the relation link 231 and the event link 233 are established, the user of the mobile terminal may find a need or desire to contact Andrew Adams However, due to passage of time and the like, the user may have forgotten Andrew Adams' name and only remember that Andrew Adams is associated with Brad Baker. In that case, the user is still able to find Andrew Adams' contact information by using the context link 231. More specifically, the user may only remember that Andrew Adams is associated with Brad Baker. In that case, the user may first find Brad Baker's contact information and, using the context link 231, find Andrew Adams' contact information even without remembering Andrew Adams' name. Similarly, if the user of the mobile terminal only remembers that he met Andrew Adams at the event 240, the user may first find the event 240 and, using the context link 233, again find Andrew Adams' contact information without remembering Andrew Adams' name.

Accordingly, by using the context links 231 and 233 to respectively associate the first contact 210 with the second contact 220 and with the event 240, the user can more easily find the first contact 210 even without remembering the name of the first contact 210. For example, if the user of the mobile terminal desires to contact Andrew Adams in the future but does not remember his name, according to an exemplary embodiment of the present invention the user need only remember the context associated with Andrew Adams. In the example of FIG. 2A, if the user only remembers the event 240 where Andrew Adams was met, the user can pull up the event 240 using the scheduling function of the mobile terminal and, using the context link 233, be provided with the contact information 210 of Andrew Adams. Furthermore, when the user simply browses through the list of contacts in the future, the context links will allow the user to more easily remember the contact 210 based on a relation (e.g., cousin of Brad Baker) and an event (e.g., met at game).

Although not illustrated in detail in FIG. 2A, the second contact 220 has a context link 225 associated therewith. Similarly, the event 240 has a context link 245 associated therewith. By using the context link 225, the second contact 220 may have one or more context links associated therewith in addition to the context link 231 that now links the second contact 220 with the first contact 210. That is, although the context link 231 was generated during entry of information regarding the first contact 210, the context link 231 is associated with and links both the first contact 210 and the second contact 220. Accordingly, if the user were to browse the list of contacts of the mobile terminal in the future, the context link 225 of the second contact 220 would include a context link indicating that Brad Baker is a cousin of Andrew Adams. Similarly, if the user was to execute a scheduling function and select the event 240, the user may further select the context link 245 associated with the event 240. By selecting the context link 245, the mobile terminal would indicate that, at the event 240, the user met Andrew Adams. Moreover, because a plurality of objects may be associated with a single object using a plurality of context links, the event 240, which is a single object, may be associated with a plurality of objects, such as a plurality of contacts, using different context links. As an example, a plurality of contacts, such as all contacts who attended the event, may be associated through context links with the event 240.

Figure 2B:
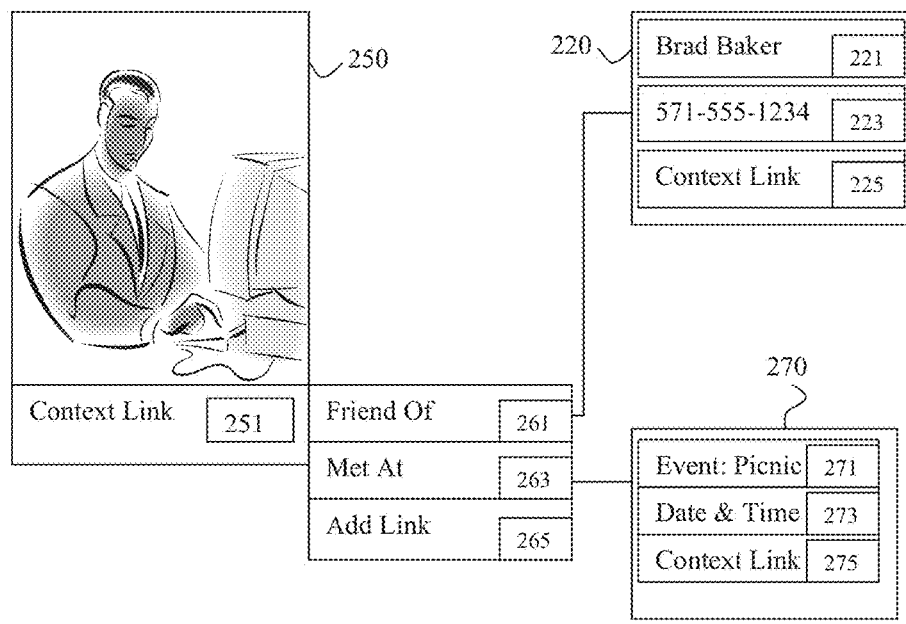

Referring to FIG. 2B, an image file 250 is provided as an object in the mobile terminal. The image file 250, which may be, for example, a JPEG file, may have been obtained by any of several methods such as downloading from an Internet site, capturing with a camera unit of the mobile terminal, received in an email message, and the like. The image file 250 includes a context link 251 that allows the user of the mobile terminal to contextually associate links or information with the image 250. In the illustrated example, the context link 251 includes a relation link 261 that indicates that the subject of the image 250 is a friend of the second contact 220. The context link 251 also includes an event link 263 that indicates an event 270 at which the user met the subject of the image file 250. Similar to the event 240 illustrated in FIG. 2A, the event 270 includes information indicating the type of event 271 (e.g., picnic), the date and time of the event 273, and a context link 275. By using the relation link 261 and the event link 263, the user is advantageously provided context regarding an association with the image 250. An example of a situation in which the context links 261 and 263 may be established and used will assist in clarifying the invention In the example of FIG. 2B, the user may capture the image 250 using a camera unit mounted on the mobile terminal while the user was attending the event 270. Although the user may have been introduced to the subject of image 250 as a friend of Brad Baker, the user may not have been able to obtain contact information of the subject of the image 250. In that case, the user may associate the image 250 with Brad Baker's contact information 220 using the relation link 261. Similarly, the user may associate the image 250 with the event 270 using the event link 263, which may be manually input to associate the image 250 with the event 270 or may be automatically input if the image 250 were taken during the scheduled time of the event 270. Accordingly, if at some time in the future the user desires to retrieve information about the image 250, the user may find the image 250 by remembering the event 270 at which the image 250 was taken and using the context link 263 associating the image 250 with the event 270. Alternatively, if the user remembers that the subject of image 250 is a relation of Brad Baker, the user can simply search on Brad Baker's contact information 220 and, using link 225, find the image 250 based on its association with Brad Baker. Even further, when the user executes a gallery viewing function of the mobile terminal and views the image 250, the user will be provided context information associating the image 250 with the contact 220 and with the event 270. Therefore, the user will be able to more readily remember the subject of the image 250.

As described above, by associating the image 250 with the event 270 using the context link 263, the mobile terminal also associates the event 270 with the image 250. That is, if the user executes a scheduling function and selects the event 270, by further selecting the context link 275, the mobile terminal indicates that the subject of the image file 250 was met at the event 270. Also, because a plurality of objects can be linked to a single object, by selecting the context link 275, the mobile terminal may present a plurality of context links associated with the event 270. That is, by selection of the context link 275, the mobile terminal may not only present the image file 250 as an associated object, but also present additional context links (not shown) associated with the event 270, for example context links associated with other contacts, events, multimedia files, URLs, or other objects associated with the mobile terminal.

Although not illustrated in FIG. 2B, in an exemplary embodiment of the present invention, the image 250 may be contextually associated with contact information of the subject of the image 250. For example, the image 250 may be of an individual named Charles Carter. According to an exemplary embodiment, the context link 251 may include a link from the image 250 to contact information (not shown) of Charles Carter. In that case, if the user of the mobile terminal desired to find the contact information but could not remember the name "Charles Carter," nor remember that Charles Carter is a friend of Brad Baker or that Charles Carter was met at the picnic event 270, the user would still be able to find the contact information by finding the image 250 using an image gallery or similar function. Once the image 250 was found in the image gallery, the image 250 could be selected and context link 251 could be used to provide the contact information of Charles Carter. In that case, the user's convenience would be greatly enhanced through the ability to find the contact information while only recognizing the image 250.

In yet another exemplary implementation, a context link associating an image with contact information may be used to provide a function wherein the contacts that are most frequently called by the user may be grouped for the user's convenience. For example, the mobile terminal may determine the ten contacts that are most frequently called by the user. In that case, the mobile terminal may provide an icon or widget which, upon selection by the user, causes the display of images associated with the ten contacts that are most frequently called. The displaying of the associated images is provided by context links between each of the ten most frequently called contacts and images linked to the contacts. Upon display of the associated images, the user may select an image and, based on the context link between the selected image and the contact information associated with the selected image, establish a telephone call to the contact associated with the selected image. Of course, the number of most frequently called numbers may be more or fewer than ten. Moreover, the selection of the icon or widget may display other items contextually linked with the most frequently called contacts, such as a website associated by a context link with the contact.

Figure 2C:
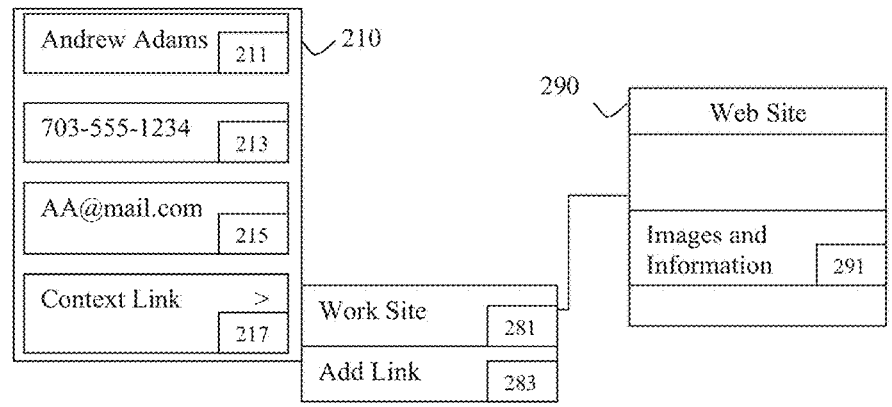

Referring to FIG. 2C, the first contact 210 is again provided as an example of an object of the mobile terminal that may include a context link 217 for associating with other objects. In this instance, the first contact 210 is linked with a website 290. More specifically, the context link 217 includes a URL link 281 by which the first contact 210 is linked to the website 290. By linking the first contact 210 to the website 290, the user of the mobile terminal is provided additional information regarding the first contact 210 so that the user can more easily determine a context in which the first contact 210 is known. For example, the website 290 may be a website for the company at which the first contact 210 is employed, or may be a website recommended by the first contact 210 for its content such as images and information 291. In another exemplary embodiment, the website 290 may be a social networking website such as Facebook, LinkedIn, MySpace, Twitter, Baidu Space, and the like. In that case, the images and information 291 associated with the website may include work history information, personal information, a personal or work related email address, images, and the like. By linking the first contact 210 to social networking website 290 using URL link 281, the user of the mobile terminal is provided an even greater amount of information by which to recognize the first contact 210. Accordingly, if the user is reviewing the list of contacts stored in his mobile terminal and does not immediately recognize the first contact 210 by name 211, phone number 213 or email address 215, the user is provided the context link 217 which associates, in this case, the first contact 210 with the website 290. Accordingly, the contextual association of the first contact 210 to the website 290 will provide the user additional information to more easily identify the first contact 210.

Moreover, the mobile terminal may include a function in which information associated with the first contact 210 is updated based on the images and information 291 associated with the first contact 210 on the website 290. For example, the individual associated with the first contact 210 may update a phone number or email address, or upload a new image to their account associated with the website 290. Based on the context link 281 between the contact first 210 and the website 290, the mobile terminal is able to receive the updated images and information 291 from the website for use in updating the first contact 210. For example, if the individual associated with the first contact 210 includes a new or revised email address on the website 290, the mobile terminal may receive that information from the website 290 and, based on the link 281, associate the information with the first contact 210 and update the email address 215. Similarly, the mobile terminal may receive an image from the website 290 that the individual has assigned as a greeting or introduction image. In that case, the mobile terminal may associate the greeting image with the first contact 210. In an exemplary implementation, the mobile terminal may provide an indication that the images and information 291 were received from the website 290. That is, the mobile terminal may include an indication of the name of the website from which the images and information 291 came from. In an exemplary embodiment, the mobile terminal scans or listens for updates from the website 290 on a periodic basis and updates the first contact 210 if it is determined that there is new information.

Figure 2D:
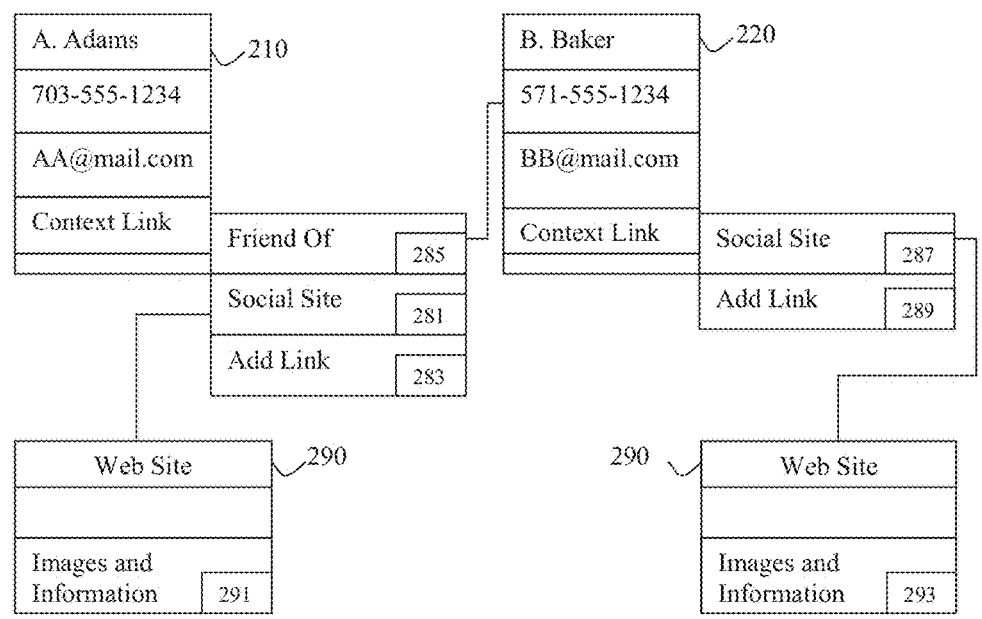

Referring to FIG. 2D, the first contact 210 is linked to the second contact 220 by a relation link 285. The relation link 285 is substantially the same as the relation link 231 discussed above with reference to FIG. 2A. In this example however, the relation link 285 indicates that the first contact 210 is a friend of the second contact 220. Furthermore, the first contact 210 and the second contact 220 are respectively provided URL links 281 and 287 to the website 290. In this case, as described above with reference to FIG. 2C, the mobile terminal may receive updated information from the website 290 regarding the first contact 210 and the second contact 220 and use the updated information to update the first contact 210 and the second contact 220, respectively. Furthermore, by providing the relation link 285 between the first contact 210 and the second contact 220, when the user of the mobile terminal views the contact information of, for example, the first contact 210, the user is made aware of not only information relating to the individual associated with the first contact 210, such as their images and information 291 received from the website 290, the user may also be made aware of the images and information 293 associated with the second contact 220. For example, if the user executes a contact management function and selects the first contact 210, the contact management function may not only display information such as a phone number and an image of the first contact 210, but may also display an image associated with the second contact 220 based on the relation link 285 between the first contact 210 and the second contact 220. Of course, if the first contact 210 has a plurality of relation links associated therewith, images of all contextually related contacts may be provided. Furthermore, the image of the second contact 220 may not necessarily be one received from the website 290. For example, if the second contact 220 includes a multimedia link that contextually links the second contact 220 with an image stored on the mobile terminal, the associated image of the second contact 220 may be displayed when the user views the first contact 210, based on the relation link 285 between the first contact 210 and the second contact 220 and the multimedia link between the second contact 220 and the image. Accordingly, the context links (e.g., 281, 285, and 287) are able to not only provide the user with additional information to assist in remembering the contact, but also provide a social networking function within the mobile terminal.

In exemplary implementations as discussed above, a context link that associates a first object with a second object may automatically associate the second object with the first object. That is, the context links may provide association in both a forward and backward direction. Referring to FIG. 2A as an example, the context link 231 that associates the first contact 210 as a friend of the second contact 220 may also associate the second contact 220 as a friend of the first contact 210. Moreover, when a context link associates two contacts, a descriptor associated with the context link may stay the same (e.g., "friend of", "spouse of") or may differ according to specific type. For example, a context link from a first contact to a second contact may indicate the first contact is the "son of" the second contact while an automatically generated context link from the second contact to the first contact would indicate that the second contact is "parent of" the first contact. Similarly, entry of a context link of "husband of" from a first contact to a second contact may cause the automatic generation of the context link "wife of" from the second contact to the first contact, and the like.

Although not illustrated in FIGS. 2A-2D, in another exemplary embodiment of the present invention, a context link may be provided to associate an object of the mobile terminal with a geo-tag. In that case, similar to the event context link, the geo-tag may be automatically or manually linked with an object of the mobile terminal. For example, if the user of the mobile terminal enters a new contact using a contact management function, the user may manually include a context link for geo-tag information to associate with the new contact. In another exemplary implementation, the geo-tag information may be automatically associated with the new contact simply by entering the new contact information. Of course, the geo-tag information could be associated with any object of the mobile terminal such as an image, an event, and the like. Furthermore, the geo-tag information may be associated with an object based on the location of the user when the object information is entered or may be selected by the user based on a desired location. Using the associated geo-tag context link information, the user may be able to search for and find an object even without knowing specific information about the object. For example, using the contextually associated geo-tag information, the user may be able to find a contact even without knowing the contact's name. That is, the user may only remember the location at which the contact information was input, for example the location near a landmark such as the Washington Memorial. By executing a geographical search function provided by the mobile terminal, the user may search on "Washington Memorial" and be provided all information associated with that geographical location. In that case, because the contact information was input while the user was near the Washington Memorial, or because the user selected the location of the Washington Memorial to associate with the contact, the geo-tag associated with the contact reflects the location of the Washington Memorial. Therefore, when the user searches on "Washington Memorial" the geo-tag reflecting that location is found and, based on the context link between the geo-tag and the contact, the information of the desired contact can also be found. Accordingly, because the contact information is associated with the Washington Memorial using the geo-tag context link, the desired contact can be found based on the geo-tag context link.

Similarly, the scheduling function, the image viewing function, or any other function of the mobile terminal may have a search function associated therewith. Using an associated search function, the user of the mobile terminal may be able to search for a known event, a known image, and the like, and, once the event, image, etc. is found, have access to all context links associated with the found object. As an example with reference to FIG. 2A, the user of the mobile terminal may desire to find first contact 210 but cannot remember the name of the first contact 210. In that case, the user may only remember meeting the first contact 210 at an event entitled "Game" without remembering any more details about the specific game such as time or location. In that situation, the user may search on "Game" or other descriptor of event 240. Once the event 240 is found based on the search function, the context link 245, as well as any other context link associated with event 240, may be displayed. In that case, even if the user only remembers the description of the event 240 at which first contact 210 was met, the user is able to find the first contact 210 without having to know the name of the first contact 210, thus greatly increasing the convenience of the mobile terminal. Of course, searching on the descriptor of an event is merely for example and not intended to be limiting as any other function of the mobile terminal may similarly include a search function.

The objects and context links illustrated in FIG. 1 and FIGS. 2A-2D may be displayed and viewed as a string of objects and context links, as individual objects and context links, based on relationship-types of context links (e.g., familial relations only), as a combination thereof, and the like.

In another exemplary implementation, objects and context links may be viewed based on a chosen object and the context links associated with the chosen object, based on the chosen object and context links with which the object is associated, or both.

It is to be understood that the objects and context links of FIGS. 2A-2D are merely exemplary and not to be considered limiting. That is, exemplary embodiments of the present invention may provide a context link for any object. For example, a context link may be established for a contact, for an image, between a multimedia file and a URL, between a contact and a multimedia file, between an event and a contact, between an email or other message and an image file, or any combination or perturbation of the above. Moreover, a single object may be contextually linked to a plurality of objects using any number of types of context links.

Furthermore, although the website 290 was illustrated above as an example of an external source of information that may be linked to objects of the mobile terminal, it is to be understood that other external sources may also be contextually linked. For example, any or all of an Internet Messaging site, a geotagging source, an email provider, and the like may be associated with objects of the mobile terminal using context links. Furthermore, as described above, if an external source is updated, the updated information may be downloaded to the mobile terminal based on a periodic scanning of the external source.

Figure 3:
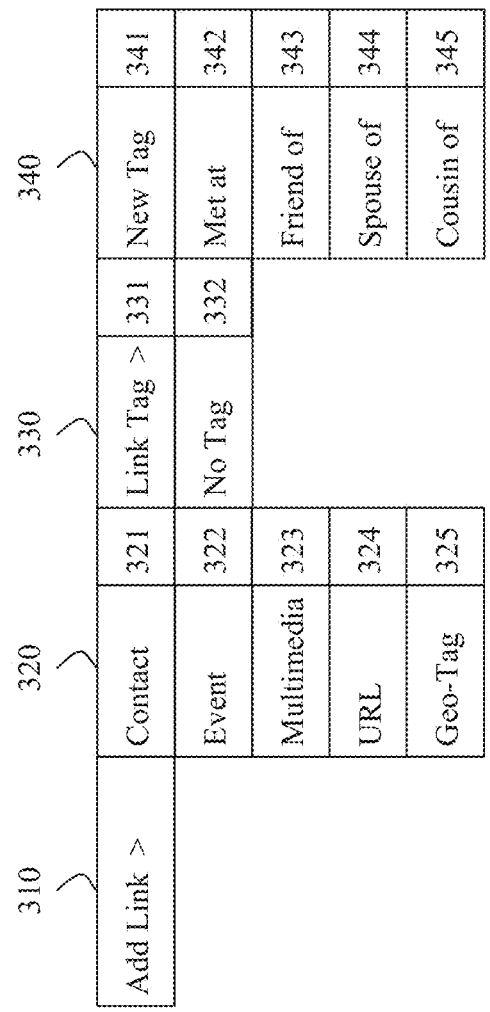
FIG. 3 illustrates a menu for adding context links according to an exemplary embodiment of the present invention.

FIG. 3 illustrates a menu for adding context links according to an exemplary embodiment of the present invention.

Referring to FIG. 3, a menu for adding context links includes a first interface 310. Using the first interface 310, a user may select to add a context link to any object of the mobile terminal such as a contact, an event, a multimedia file, and the like. In an exemplary implementation, the first interface 310 may be displayed when the user selects a contact, such as from a phonebook, as illustrated in FIG. 2A. For example, if the user selects the first contact 210 and the context link 217 is displayed, the context link 217 may include an interface (e.g., 235) that is displayed in association with existing links (e.g., 231 and 233). Alternatively, and again with reference to the first contact 210 of FIG. 2A as an example, the first interface 310 may be displayed in place of the context link 217, for example if there are no context links currently associated with the first contact 210, or as an additional field to fields 211, 213, and 215. In yet another exemplary embodiment, the first interface 310 may be displayed upon selection of a menu input key. For example, as illustrated in FIG. 2B, when a multimedia file or an image file such as the image 250 is to be associated with another object by a context link, the first interface 310 may be displayed by input of a menu key. That is, unlike contact information such as name 211, phone number 213, and the like associated with the contact 210 of FIG. 2A, a multimedia file or image file such as image 250 is not typically displayed with additional information or menu options. Accordingly, upon input of a menu key, the first interface 310 may be displayed.

In the above exemplary embodiments, the first interface 310, as well as any context link that will be generated as a result of using the menu, has a default association with the object (e.g., contact, event, multimedia file, and the like) from which the first interface 310 is selected. For example, if the first interface 310 is selected while the first contact 210 is displayed, any context link that is generated will, by default, be associated with the first contact 210. In yet another exemplary embodiment, the interface 310 may be displayed and selected from a main menu of the mobile terminal without displaying any contact, event or multimedia information. In such case, an additional menu interface (not illustrated) would be displayed for selecting an object (e.g., a contact, event, multimedia file, and the like) that is to be linked.

Upon selection of the first interface 310, and establishment, by default or menu selection, of an object that is to be linked, a second interface 320 is displayed. The second interface 320 lists different objects with which a context link may be associated. For example, the second interface 320 may allow a user to select a contact 321, an event 322, a multimedia file 323, a URL 324, and the like, for linking with the object that was previously established. Of course, the illustrated list is merely for example and not considered limiting. That is, the second interface 320 may list different objects including different types of multimedia, such as audio files and video files, a geo-tag, and the like. Furthermore, the second interface 320 may include a selection allowing the user to browse different applications on the mobile terminal for objects such as files and the like with which to associate a context link.

Upon selection of an object using the second interface 320, a third interface 330 may be displayed. The third interface 330 allows a user to select a specific tag or descriptor for association with the context link. In the illustrated example of FIG. 3, the third interface 330 includes a selection for including a link tag 331 and a selection for not including a link tag 332. That is, the addition of a link tag or descriptor is optional. For example, if the user desires to contextually link a contact with an image of the contact, a descriptor may not be necessary to provide additional context needed by the user. In that case, the user may select to not include a link tag using selection 332. Alternatively, the user may select to add a link tag or descriptor using selection 331. In that case, a fourth interface 340 is provided. The fourth interface 340 includes a list of tags or descriptors that may be used to provide a contextual description for linking a first object. For example, the fourth interface 340 may be used to provide a descriptive context regarding an object of the mobile terminal. In that case, the user may select field 341 that allows the user to associate a new tag with the object. More specifically, new tag field 341 allows the user to input free form text as a context link descriptor of the object, such as a description of where a contact was met or where the contact works. The fourth interface 340 may also be used to provide a tag or descriptor for linking a first object with a second object, such as a contact with another contact, a contact with an event, a contact with a multimedia file, an image with an event, and the like. As illustrated in FIG. 3, the fourth interface 340 may include a first tag 342 that a user may choose to indicate an event at which a linked contact was met. Similarly, the fourth interface 340 may include a second tag 343 that indicates a first contact is a friend of a linked contact. The fourth interface 340 may include a third tag 344 indicating one contact is a spouse of another contact, and a fourth tag 345 indicating that one contact is a cousin of another contact. Of course, the illustrated tags 342-345 are merely for example and implementation of the present invention may include additional or fewer tags. Also, the fourth interface 340 may include general descriptors such as 'relation tags' or 'contact tags' that function as upper menu selections. In that case, when 'relation tags' is selected for example, various tags such as 'cousin of,' 'friend of,' 'spouse of,' and the like, that may be used to indicate a relation, may be displayed. Furthermore, the fourth interface 340 may include the field 341 that allows the user to enter specific text to customize the tag of the context link. In that case, the user may input a descriptor that is more appropriate for the particular context than any default descriptor provided by the fourth interface 340. A custom link may be used to link any object such as contacts, events, multimedia files, and the like of the mobile terminal. Also, the user may be provided with an option to input default tags that are automatically displayed as part of the fourth interface 340.

Although not shown in the figures, in another exemplary embodiment, if the first interface 310 is selected from a main menu rather than from an object such as a contact or event as illustrated in FIGS. 2A-2D, an additional interface may be provided to establish an object (e.g., a contact, event, multimedia file, and the like) with which the context link is being associated. That is, in the exemplary embodiments as illustrated in FIGS. 2A-2D, if the first contact 210 has been selected by the user and the first interface 235 is then selected for adding context links, any context links will automatically be associated with the first contact 210 as a default. On the other hand, if the first interface 310 is selected from a main menu, a default does not exist for associating the context link. Therefore, an additional interface may be necessary to establish an object (e.g., a contact, event, multimedia file, and the like) with which the context link will be associated.

Figure 4:
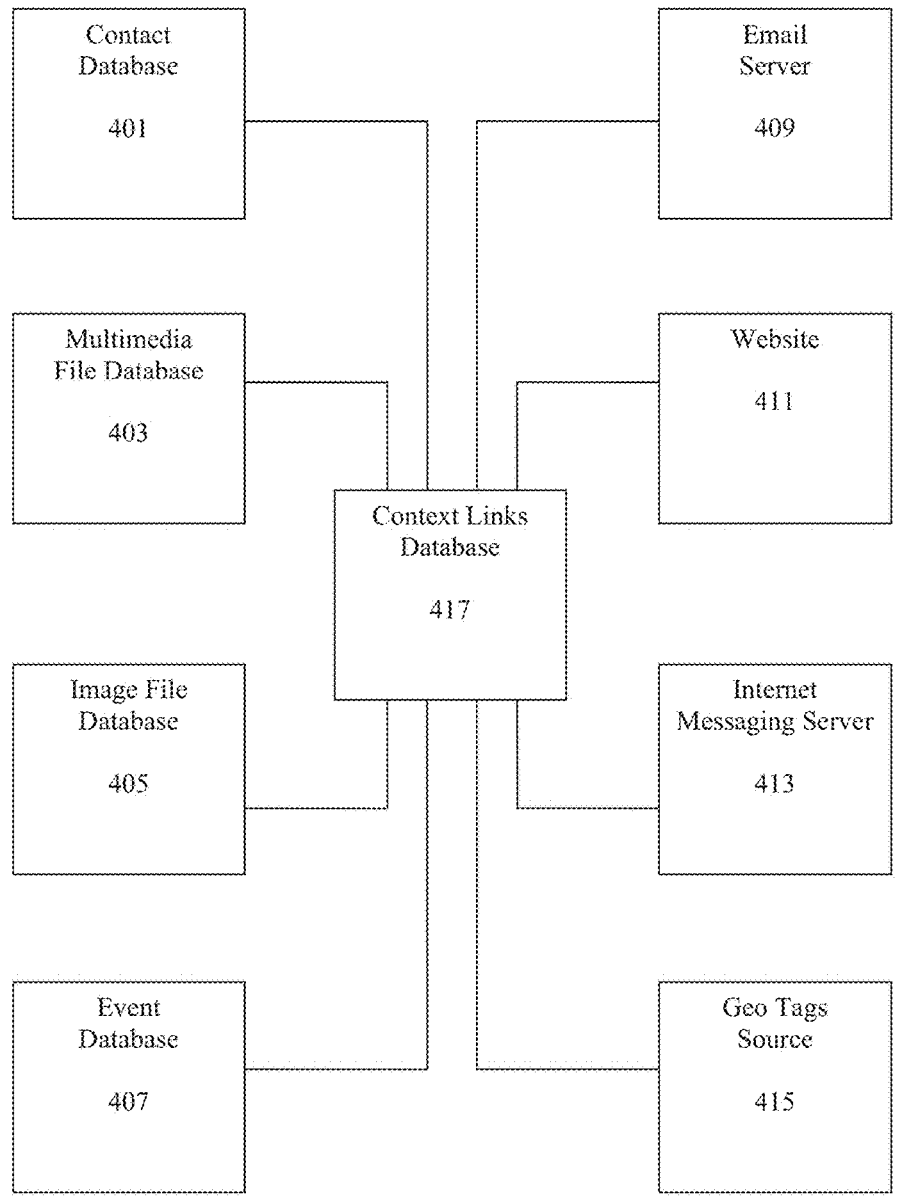
FIG. 4 diagrammatically illustrates connections of a context links database according to an exemplary embodiment of the present invention.

FIG. 4 diagrammatically illustrates connections of a context links database according to an exemplary embodiment of the present invention.

Referring to FIG. 4, a context links database 417 is provided for storing context links that are established for objects of a mobile terminal. Accordingly, the context links database 417 is connected to each of a contact database 401, a multimedia file database 403, an image file database 405, and an event database 407. By providing and maintaining the context links database 417, the mobile terminal is able to manage context links established for objects of the mobile terminal. For example, a first contact and a second contact may be included in the contact database 401. If a first context link is established between the first and second contact, the first context link is maintained in the context link database 417 as linking the first and second contact. Similarly, if a second context link is established between the first contact and an image included in image file database 405, the second context link is also maintained in the context link database 417. Accordingly, when a user of the mobile terminal executes a contact management function and selects the first contact, the context links database provides information regarding the first and second context links associated with the first contact for display with the first contact. That is, upon selection of the first contact, the mobile terminal will display not only the related information of the first contact such as name, phone number, and email address, but will also display the second contact and the image based on the context links. Of course, this is merely an example and, as discussed above, the context links can be provided for and between any objects of the mobile terminal.

The context links database 417 is also connected to external sources such as an email server 409, a website 411, an Internet messaging server 413 and a source of geo tags 415. By being connected to the external sources, the context links database 417 can support a context link between an object of the mobile terminal and one or more of the external sources. As an example, a third context link may be established between the first contact of the contact database 401 and the website 411. In that case, the context link may include a URL associated with the website 411. By maintaining the third context link that associates the first contact and the website 411 in the context links database 417, the mobile terminal is again able to manage the context links established for objects of the mobile terminal. That is, with the third context link established between the first contact and the website 411, when a user of the mobile terminal executes a contact management function and selects the first contact, the context links database 417 provides information regarding the first, second and third context links that are each associated with the first contact for display with the first contact. Of course, the external sources illustrated are merely by way of example and not intended to be limiting. For example, there may be additional external sources besides or in place of those shown. Moreover, there may be a plurality of each type of source. For example, there may be a plurality of websites that are linked to the mobile terminal and have a context link maintained by the context links database 417.

As discussed above, by linking of various objects of the mobile terminal with external sources and maintaining of the links in the context links database 417, the mobile terminal is able to provide updates to the linked objects when updates are discovered in the external sources. For example, the mobile terminal may be set to periodically scan the external sources to determine if updates have been made or otherwise periodically receive updates from the external sources. If an update is detected, the mobile terminal can apply the updated information to the relevant object based on the context links maintained by the context links database 417. For example, if the first contact of the contact database 401 has a context link with a social networking website, if an update associated with the first contact is detected on the social networking website, the updated information may be received by the mobile terminal and provided to the first contact for updating based on the context link information between the first contact and the social networking website maintained in the context links database. Furthermore, the context link information maintained by the context links database 417 may be used such that, when the user executes a contact management function and selects the second contact, based on the second contact's context link to the first contact and the context link of the first contact to the social networking site, the mobile terminal may not only display information about the second contact but may also display information regarding the first contact as well as information from the social networking website related to the first contact.

Figure 5:
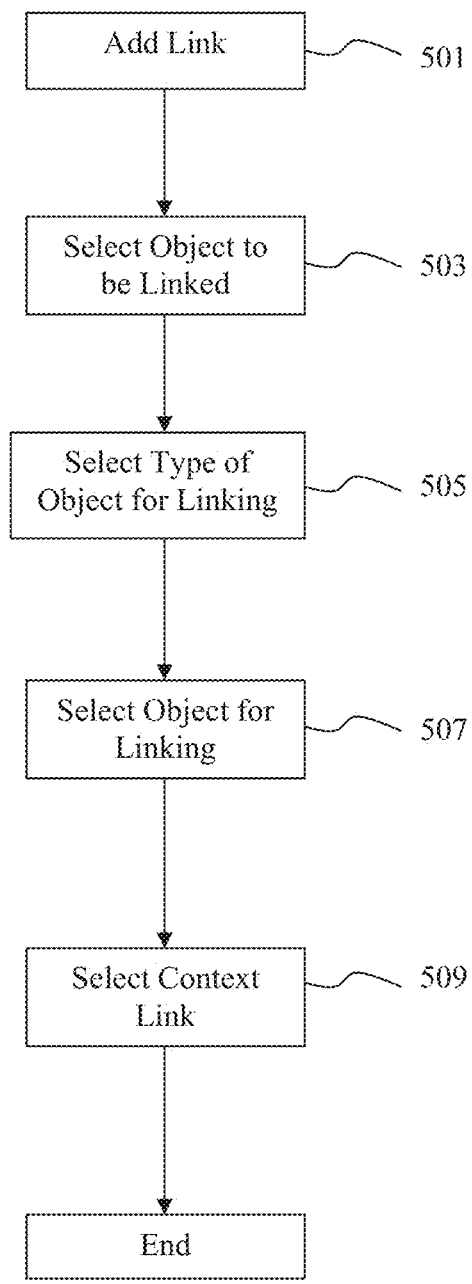
FIG. 5 is a flowchart illustrating a method of adding a PIM context link according to an exemplary embodiment of the present invention.

FIG. 5 is a flowchart illustrating a method of adding a PIM context link according to an exemplary embodiment of the present invention.

Referring to FIG. 5, in step 501, a user input for selecting to add a context link is detected. As discussed above, the user input for selecting to add a context link may be received by selecting a field displayed with an object such as a contact, event, multimedia file, and the like, (e.g., "Add Link" field 129 illustrated in FIG. 1) or by selecting an "Add Link" field from a main menu. In an alternative exemplary implementation, the addition of a context link in step 501 may be performed automatically without selection by user input. For example and as discussed above, a context link may be automatically selected for associating an image with an event that occurs while the user inputs the image into the mobile terminal. Similarly, a context link may be automatically selected for associating a contact with a geo-tag that represents a location of the user when the contact information is input into the mobile terminal. In step 503, an object to be linked is selected. The selection of the object to be linked may be based on a default object, may be based on selection of an existing object by the user, and may be based on entry of a new object. For example, if an object such as a contact, event, multimedia file, and the like are displayed and a user selects to add a context link using a field associated with the displayed object, the displayed object is considered the default to be linked. On the other hand, a user may select the object to be linked from a menu. In that case, the user may be allowed to browse through entries associated with different functions of the mobile terminal in order to select an object to be linked. For example, the user may browse a phonebook function to select a contact to be linked or may browse a scheduling function to select an event to be linked. Furthermore, if the user wishes to link neither a default object nor an existing object, the user may be provided an option to add a new object to be linked.

Upon selection of an object to be linked in step 503, the user selects a type of object for linking in step 505. For example, the mobile terminal may display a list of types of objects for selection by the user. The types of objects may include contacts, events, multimedia files, SMS messages, emails, MMS messages, and the like. Upon determination of the type of object for linking in step 505, a selection is made of the object for linking in step 507. That is, upon determination of the type of object for linking in step 505, the mobile terminal may display a list of available objects based on the selected object type. For example, if a contact type object is selected for linking in step 505, the mobile terminal may display a list of contacts stored in the mobile terminal and more specifically stored in a contacts database. In that case, the user may select the object for linking from the displayed contacts. Similarly, if an event type object is selected for linking in step 505, the mobile terminal may display a list of events from which the user may choose an event for linking, such as a list of events from an event database. Furthermore, the selection of the object for linking may include an option allowing the user to enter a new object. For example, the user may be provided a menu option that provides for entering a new contact, a new event, and the like that may be used for linking.

In step 509, a context link is selected with which to associate the object to be linked with the object for linking. For example, as illustrated in FIG. 3, the mobile terminal may display a list of context links such as "Friend of", "Spouse of", "Cousin of", "Met at", and the like. From the displayed list, the user may select the link that best suits the desired or actual context between the objects. In an exemplary implementation, the terminal may display general descriptors of context links that indicate different groupings of similar context links. For example, the mobile terminal may display general headings such as "Family", "Work", and the like. Upon selection of the heading "Family", the mobile terminal may further display more specific types of context links such as "Son of", "Husband of" and the like. Furthermore, the mobile terminal may provide for inputting a custom link that more appropriately suits the desired or actual context between the linked objects. Upon selection of the context link for linking the two objects, the procedure is ended.

Figure 6:
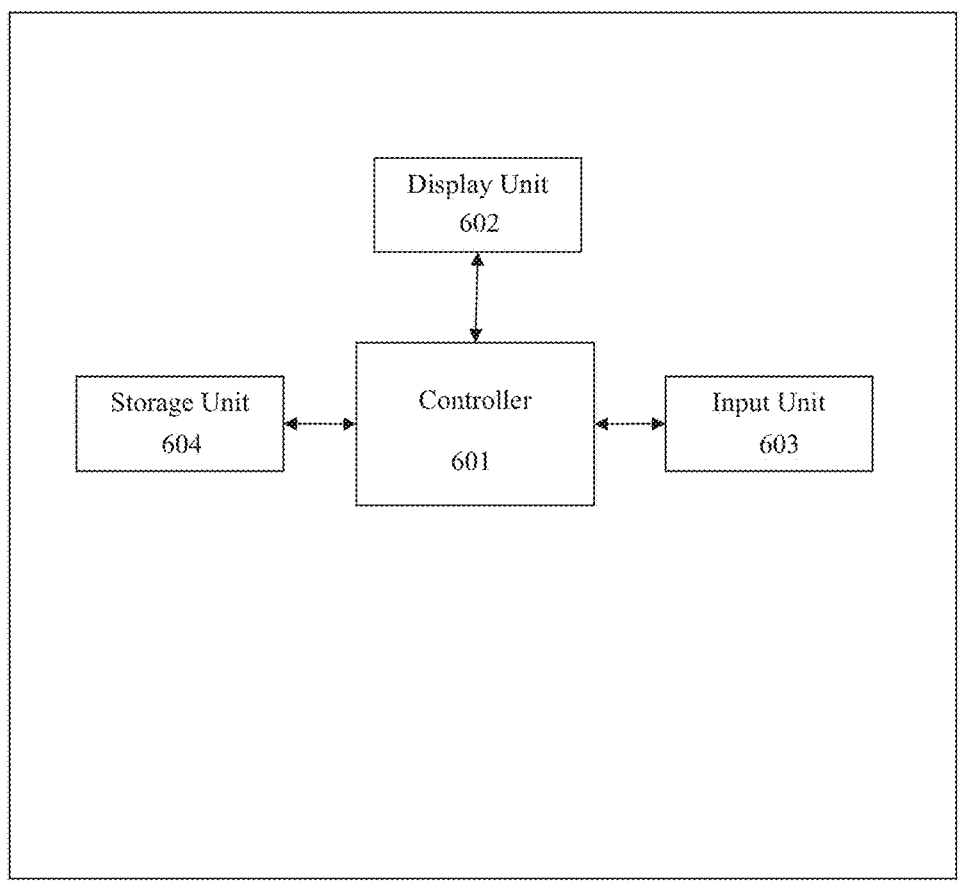
FIG. 6 is a block diagram illustrating a mobile terminal for implementing PIM context links according to an exemplary embodiment of the present invention.

FIG. 6 is a block diagram illustrating a mobile terminal for implementing PIM context links according to an exemplary embodiment of the present invention.

Referring to FIG. 6, a mobile terminal includes a controller 601, a display unit 602, an input unit 603 and a storage unit 604. The controller 601 controls the overall functions of the mobile terminal including the provision and display of a PIM context link function. The display unit 602 displays various functions output by the controller 601. For example, the display unit 602 displays various menus used for selecting a context link. More particularly, the display unit 602 may display an object such as a contact, an event, a multimedia file, and the like that includes a field for selecting to add a context link. The display unit 602 may be provided as a Liquid Crystal Display (LCD). In this case, the display unit 602 may include a controller for controlling the LCD, a video memory in which image data is stored and an LCD element. If the LCD is provided as a touch screen, the display unit 602 may perform a part or all of the functions of the input unit 603. The input unit 603 includes a plurality of keys used to receive input from a user. The plurality of keys may include alpha-numeric characters keys, function keys, soft keys, and the like. Upon execution of a PIM context link function, the keys may receive input from a user, for example for selecting an object type or context link, wherein the input is analyzed by the input unit 603 and a result of the analysis output to the controller 601. The storage unit 604 includes volatile and non-volatile memories for storing temporary data associated with execution of various functions by the mobile terminal and data that is to stored longer term. For example, the long term data may include programs associated with the various functions, contacts associated with a phonebook function, event data associated with a scheduler function, and the like. Moreover, and with reference to FIG. 4, the storage unit 604 may have stored therein a links database, a contacts database, a multimedia file database, an image file database, and an event database. As described above, the links database includes links between various objects such as contacts, events, files, and the like input by the user, the contacts database includes information associated with a phonebook type function and includes contacts stored by the user, the event database includes information associated with a scheduling function and includes various events stored by the user, and the multimedia file database and image file database respectively include various multimedia files such as MP3 files, MPEG files, and the like, and JPEG files.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing information in a mobile terminal, the method comprising:
    selecting, by a user of the mobile terminal, a first object to be linked, the first object comprising a first contact relating to a first individual, and the first object being selected from among a plurality of contacts stored in the mobile terminal;
    selecting, by the user of the mobile terminal, a second object for linking with the first object, the second object comprising a second contact relating to a second individual, and the second object being selected from among the plurality of contacts stored in the mobile terminal;
    selecting, by the user of the mobile terminal, a third object for linking with the first object and the second object, the third object comprising an object associated with an Internet based networking site comprising an uniform resource locator (URL) link on which the first individual and second individual have accounts;
    linking, using a first context link of the first object, the first object with the second object via a relation link, the relation link displaying a relationship between the first individual of the first object and the second individual of the second object;
    linking, using the first context link of the first object, the first object with the third object via the URL link;
    receiving, by accessing the URL link of the third object, periodic updates of the selected first object from the Internet based networking site, the updates comprising at least one of new personal information and updated personal information relating to the first individual and the second individual;
    updating the first object and the second object according to the received updates; and
    displaying, on a display of the mobile terminal based on the relation link, at least one of the new personal information and the updated personal information of the second object in response to a selection of the first object by the user of the mobile terminal, wherein the displaying of the second object includes concurrently displaying the personal information of the second object and at least one of the new personal information and the updated personal information of the first object.

2. The method of claim 1, wherein the selecting of the first object stored in the mobile terminal comprises selecting at least one of contact information and a contact file.

3. An apparatus for managing information in a mobile terminal, the apparatus comprising:
    a touch screen display configured to:
        receive a first user input, from a user of the mobile terminal, for selecting a first object to be linked, the first object comprising a first contact relating to a first individual, and the first object being selected from among a plurality of contacts stored in the mobile terminal,
        receive a second user input, from the user of the mobile terminal, for selecting, a second object for linking with the first object, the second object comprising a second contact relating to a second individual, and the second object being selected from among the plurality of contacts stored in the mobile terminal,
        receive a third user input, from the user of the mobile terminal, for selecting a third object for linking with the first object and the second object, the third object comprising an object associated with an Internet based networking site comprising an uniform resource locator (URL) link on which the first individual and second individual have accounts; and
    a processor configured to:
        link, using a first context link of the first object, the first object with the second object via a relation link, the relation link displaying a relationship between the first individual of the first object and the second individual of the second object,
        link, using the first context link of the first object, the first object with the third object via the URL link,
        receive, by accessing the URL link of the third object, periodic updates of the selected first object from the Internet based networking site, the updates comprising at least one of new personal information and updated personal information relating to the first individual and the second individual,
        update the first object and the second object according to the received updates, and
        display, on the touch screen display based on the relation link, at least one of the new personal information and the updated personal information of the second object in response to a selection of the first object by the user of the mobile terminal, wherein the displaying of the second object includes concurrently displaying the personal information of the second object and at least one of the new personal information and the updated personal information of the first object.

4. The apparatus of claim 3, wherein the selecting of the first object stored in the mobile terminal comprises selecting at least one of contact information and a contact file.

* * * * *